Patented Oct. 30, 1934

1,978,840

UNITED STATES PATENT OFFICE 1,978,840

METHOD OF MANUFACTURING HALO-FLUORO HYDROCARBONS

Albert L. Henne, Columbus, Ohio, assignor, by mesne assignments, to General Motors Corporation, a corporation of Delaware No Drawing. Application January 30, 1931, Serial No. 512,473. Renewed September 9, 1933

4 Claims. (Cl. 260—162)

This invention relates to processes for the manufacture of fluoro and/or halo-fluoro derivatives of aliphatic hydrocarbons.

The objects of my present invention are to provide commercial processes whereby fluoration of the aliphatic hydrocarbon derivative or derivatives may take place without the aid of a catalyst other than the fluorating agent itself, and more particularly, to fluorate the hydrocarbon derivative by the use of a compound containing pentavalent antimony having combined therewith three atoms of fluorine and two atoms of chlorine, the formula being $SbF_3Cl_2$.

This compound ($SbF_3Cl_2$) is prepared by allowing chlorine and antimony trifluoride to interact in a metal vessel kept at a temperature preferably above 70° C. After the reaction is initiated, the heat evolved is sufficient to maintain the reacting mass at the proper temperature. The rate of reaction is improved by stirring the mass. This has been done by revolving the antimony compound in a ball mill. The resulting antimony trifluorodichloride is a viscous liquid which is easily poured out of the reaction vessel.

This antimony trifluorodichloride is a very active fluorating agent and it has been found that it will fluorate an aliphatic hydrocarbon derivative without the aid of a catalytic agent. It can be regarded as its own catalytic agent so that the compound fulfills the dual functions of a fluorating agent and of a catalyzing agent. A specific example of fluoration by the use of this compound is as follows:

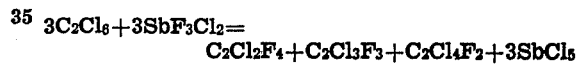

The reactants are placed in a vessel and heated and the reaction goes on quite rapidly.

An example of another reaction is as follows:

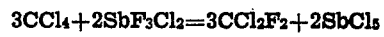

The reaction velocity is controlled by the rate of delivery of one of the reactants, preferably carbon tetrachloride in the latter example, into the reaction chamber.

The fluoro and/or halo-fluoro derivatives of aliphatic hydrocarbons which include the methane, ethane, ethylene, etc., series may be made by this method. For example compounds from the various series such as $CHClF_2$, $CCl_2F_2$, $C_2Cl_2F_4$, $C_2F_6$, and $C_3H_3F_2Br_3$ may be obtained from the proper initial materials.

In order to obtain a preferred fluorated compound from a given reactant, dephlegmation and control of the delivery of the reaction products may be employed.

It has been found that this process is of particular advantage in the fluoration of the compounds having more than one carbon atom in a molecule, which compounds are more difficult to fluorate than compounds of the methane series.

What is claimed is as follows:

1. A step in the manufacture of halo-fluoro hydrocarbons which consists in fluorating an aliphatic hydrocarbon containing halogen other than fluorine with antimony trifluorodichloride as the fluorating agent.

2. A step in the process of manufacturing fluorated compounds which comprises fluorating an aliphatic hydrocarbon containing halogen other than fluorine and having more than one carbon atom in its molecule which consists in bringing the fluorating agent antimony trifluorodichloride in contact with such compound.

3. A step in the process of fluorating hexachloroethane which comprises fluorating the hexachloroethane with antimony trifluirodichloride as the fluorating agent.

4. The method of manufacturing a halofluoro derivative of an aliphatic hydrocarbon which consists in interacting an aliphatic hydrocarbon containing halogen other than fluorine with antimony trifluoro dichloride in a reaction field, and withdrawing the desired holofluoro derivative from the reaction field as it is formed.

ALBERT L. HENNE.